J. U. F. ANDERSEN AND A. F. B. IVERSEN.
AUTOMATIC STARTING AND SHORT CIRCUITING DEVICE FOR ASYNCHRONOUS MOTORS.
APPLICATION FILED DEC. 6, 1918.
1,412,228.
Patented Apr. 11, 1922.
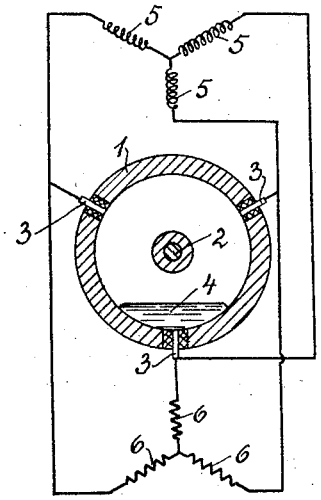
Fig. 1.
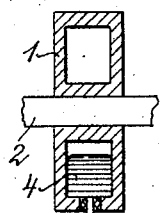
Fig. 2.
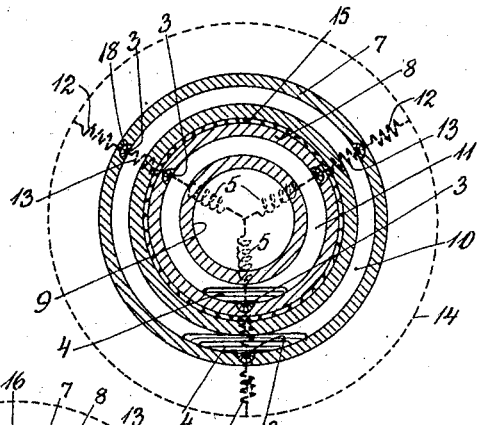
Fig. 3.
Fig. 4.
Fig. 5.
Fig. 6.
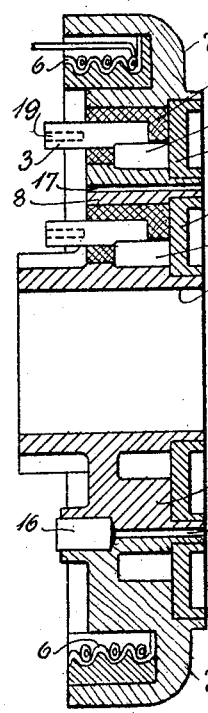
Inventors:
Joakim Ulrik Frederik Andersen and
Adolf Frederik Bennik Iversen
By Attys.
Bauer, Dark & Meyers

UNITED STATES PATENT OFFICE.

JOAKIM ULRIK FREDERIK ANDERSEN AND ADOLF FREDERIK BENNICK IVERSEN, OF COPENHAGEN, DENMARK.

AUTOMATIC STARTING AND SHORT-CIRCUITING DEVICE FOR ASYNCHRONOUS MOTORS.

1,412,228.  Specification of Letters Patent.  Patented Apr. 11, 1922.

Application filed December 6, 1918. Serial No. 265,665.

*To all whom it may concern:*

Be it known that we, JOAKIM ULRIK FREDERIK ANDERSEN and ADOLF FREDERIK BENNICK IVERSEN, both residing at Copenhagen, Denmark, have invented new and useful Improvements in Automatic Starting and Short-Circuiting Devices for Asynchronous Motors, of which the following is a specification.

The present invention relates to automatic starting and short-circuiting devices for asynchronous motors with one or more receptacles fastened on the motor shaft and partly filled with some electrically conductive fluid, for instance quicksilver, which is actuated by the centrifugal force under the rotation and, thereby, forms conductive connections for two or more electrodes inserted in the walls of the receptacle and connected with the rotor winding and with the starting resistance, if such be used, and the invention is characterized in that the short-circuiting of the rotor winding and of the steps of the starting resistance, if such be used, is effected by the liquid provided in each of the vessels assuming the shape of a ring, when actuated by centrifugal force, and at a certain angular speed depending on the diameter of the vessel directly short-circuiting the electrodes concerned and the character of the fluid which fills the remaining portion of the receptacle or receptacles.

The drawing shows various manners of constructing the invention,

Fig. 1 shows, in outline, a cross-section of one construction of a starting and short-circuiting device for a three-phase asynchronous motor with horizontal shaft, Fig. 2 a longitudinal section of the same, Fig. 3 diagrammatically a cross-section of a starting and short-circuiting apparatus with horizontal shaft and with two annular chambers encircling one another, Fig. 4 a cross-section of a modified construction of the same, Fig. 5 a longitudinal section of the same, Fig. 6 a longitudinal section of a construction for a motor with vertical shaft.

In the construction illustrated in Fig. 1-2, the apparatus consists of a cylindrical closed vessel 1, fastened to the motor shaft 2. In the outer cylindrical wall of the vessel, there are inserted three electrodes 3 insulated from the vessel 1. In the vessel, there is contained so much quicksilver 4 that it covers an arc of between 60° and 90° of the outer wall of the vessel, while the remainder of the same is filled out with either pure water or oil or a mixture of water and alcohol or of water and glycerine or, may be, with a mixture of water, glycerine and alcohol. 5 are the rotor phase windings of the motor concerned, the free ends of the said windings being connected, as shown, each to one of the contacts 3 which are also connected each to one of the phases 6 in a three-phase starting resistance.

When current is admitted to the stator winding of the motor concerned, the latter will start running in known manner. The resistances 6 are inserted in the rotor circuit from the beginning, as appears from Fig. 1. The quicksilver 4 will not immediately take part in the rotation of the vessel 1, that is not until the angular speed has reached a certain value, depending partly on the diameter of the vessel and partly on the quantitative composition of the mixture of water and glycerine or alcohol or the like contained in the vessel above the quicksilver. When the number of revolutions has reached the said value, the quicksilver will be actuated in such a manner by the centrifugal force that it takes the shape of a quicksilver ring placed along the inside of the vessel 1 and short-circuiting the resistance 6 and, thereby, the rotor windings 5, inasmuch as it interconnects all three contacts 3.

Consequently, by the apparatus shown in Figs. 1-2, there is attained a start in two steps, the resistances 6 being short-circuited suddenly. Such start may be attained by means of the constructions shown diagrammatically in Figs. 3-5. Here there are two co-axial vessels 7 and 8 with common hub 9, so that there are formed, in the apparatus, two co-axial annular channels 10 and 11. In each of these, there are inserted three electrodes 3 displaced 120° relatively to one another. Each of the chambers contains so much quicksilver 4 that the latter covers an arc of about 60° of the outer cylindrical walls in each of the channels. The remaining space in each of these is filled with a mixture of water and alcohol or water and glycerine or a mixture of all these three substances, the quantitative composition of this mixture being adjusted according to the number of revolutions of the motor, so that there is attained, in the manner specified below, a short-circuiting in two steps of the three-phase starting resistance. This resistance is divided into two steps 12 and 13, as shown with dotted lines in Figs. 3 and 4. Of the two steps thereof, the one step 13 is inserted between electrodes 3 disposed opposite one another in two different channels while the other steps 12 located next to the star connection 14 of the starting resistance is connected to the exterior electrodes 3. 5 is the motor's star-connected rotor winding whose phase windings are connected each with one of the three interior electrodes 3.

The start is effected in the following manner. When the stator winding is made active, the rotor will start running, the entire starting resistance being inserted in the rotor circuit at the beginning of the starting. When the number of revolutions of the rotor has reached for instance about $\frac{2}{3}$ of the normal number of revolutions, the quicksilver 4 in the outer channel 10 will assume an annular shape and short-circuit the three outer electrodes 3, so that the first step 12 of the starting resistance is cut out. The number of revolutions at which this happens depends on the dimensions of the apparatus and the composition of the fluid mixture above the quicksilver in the channels 10 and 11. When the number of revolutions reaches for instance about $\frac{4}{5}$ of its normal value, the quicksilver in the central channel 11 will assume an annular shape and cut out the second step 13 of the starting resistance, and then the rotor winding 5 will be directly short-circuited. Thus the only starting manipulation to be performed is, simply, to close the stator circuit.

As mentioned above, it is possible to adjust the number of revolutions whereat the annularity of the quicksilver is attained, by modifying the composition of the liquid mixture in the channels 10 and 11. The more glycerine there is contained in the mixture, the more viscid is the mixture, and the lower will be the number of revolutions whereat the annularity takes place.

Besides adjustment of the annularity, the liquid mixture has also for its object to extinguish any sparks formed in the apparatus.

The object of the glycerine is to regulate the number of revolutions, the effect of the admixture of glycerine being that the number of revolutions whereat the short-circuiting takes place becomes lower than for pure water. It is an advantage of the invention that the same apparatus may be used for motors having more poles, in which the starting switch should act at a lower speed; for instance, for four-poled as well as for six-poled motors, and this may be attained either by making the electrodes project more into the apparatus, so as to carry the quicksilver around with them, or by adding more glycerine to the water, so as to diminish the difference of specific gravity between the quicksilver and the superposed liquid.

In the constructions shown in Figs. 3-5, the vessel containing the quicksilver consists as named above of two rings 7 and 8 encircling one another and being insulated electrically from one another by means of a ring 15 (Fig. 3) of suitable insulating material or by means of plugs 16 (Figs. 4-5) of insulating material, said plugs being inserted in holes which are placed partly in the two rings 7 and 8, and partly in a narrow circular airgap 17 (Figs. 4-5) between the rings 7 and 8. The plugs 16 may be made of fibre or the like and the insulating ring 15 (Fig. 3) may be made of micanite or other suitable insulating material. The rings 7 and 8 may be shrunk on one another. Alternatively, the rings may be placed concentrically, and the annular space between them may be filled by casting with insulating material. The electrodes are fitted with slots 19 adapted to receive the wiring connections from the resistance 6 which is here built into an annular channel in the exterior ring 7. The electrodes are insulated from the rings 7 and 8 by means of sleeves 18 of insulating materials. The sleeves may be of cylindrical or slight conical shape and are driven into holes in the rings 7 and 8, said holes being parallel to the axis of the apparatus. The electrodes 3 may be for instance conical and driven into the insulating sleeves 18. The resistance 6 is placed and insulated in similar manner as an ordinary heating unit, so that it will stand a considerably larger load than starting resistances in general.

In the construction shown (Figs. 3-5). there are provided only two channels 10 and 11, for reception of the quicksilver. They are closed by means of rings 20, 20 welded to the rings 7 and 8 respectively, or driven into said rings and closed watertight to same by means of suitable matrices, for instance minium or ceruse.

The electrodes may be enamelled and inserted directly in the material of the rings 7 and 8 without any other insulation than the enamel coating. As filling liquid there may be used, as named above, a mixture of either water, alcohol and glycerine, or water and alcohol, or water and glycerine. By these mixtures the apparatus is rendered frost-proof. Pure distilled water without any admixture may be used, and instead of all three substances mentioned there may be used oil, for instance transformer oil.

The starting and short-circuiting apparatus may be constructed with any suitable number of channels and sets of electrodes, and the starting resistance will not necessarily have to be attached to the apparatus itself, but may instead be an independent starter of known construction. Ordinarily, it will be most suitable to fasten the starter either on the apparatus itself or, at any rate, on the rotor shaft so that it will rotate together with the latter.

In the two constructions in Figs. 3-5 the starting resistance 6 is built into the short-circuiting apparatus as a heating member (Fig. 5). This feature is of importance if water without the admixture of alcohol be used in the apparatus, as the resistance will in that case be able to thaw the water in case the latter, when the motor is standing still, might freeze to ice during cold weather, or when used in cold places.

The channels containing the quicksilver are as named above insulated electrically from one another, so that no momentary short-circuitings of the resistance steps will occur, during the starting of the motor before the ring is formed and, consequently, that no sparking will take place.

Experience has shown that such formation of sparks causes the generation of gas in the channels. The generation of gas is especially forceful when the channels are not insulated from each other and alcohol or glycerine or both are admixed with the water, and it is probably due to decomposition of these substances by the sparks. When the channels contain only quicksilver and distilled water, there appears nevertheless a generation of gas, although of a different nature and to a much smaller extent.

Although the fact that the channels are insulated electrically from one another entirely prevents the formation of sparks due to momentary short-circuitings, the insulation of the electrodes is nevertheless most suitably made of fireproof material, such as soapstone, porcelain, enamel, or the like, as thereby protection is attained against the action of any few sparks which might occur at the moment when the quicksilver is thrown out as a ring.

The number of revolutions whereat the short-circuiting in each individual channel is effected may be adjusted by placing the electrodes so that they project more or less beyond the cylindrical walls of the channels. The more the electrodes project, the lower becomes the number of revolutions whereat the short-circuiting in the channel concerned occurs, as the projecting electrodes carry the quicksilver along.

The resistance 6 may of course be arranged in any other suitable manner than as shown on the drawing, it may, for instance, be placed independently of the short-circuiting apparatus proper directly on the rotor shaft or on the rotor hub, and the short-circuiting device may be located inside of as well as beyond the bearings of the motor concerned.

The short-circuiting apparatus may of course also be used without resistance in which case it is fitted with only one ring, for instance if it is used in connection with rotors with starting and working windings or in connection with Professor Görge's winding or for short-circuiting of permanent resistances built together with the rotor and disposed in series with the rotor winding.

Fig. 6 shows a starting and short-circuiting apparatus for a motor with vertical shaft. It consists of a cylindrical closed vessel 21 with hub 30 fastened on the motor shaft. In the cylindrical wall of the vessel 21 there are inserted, on top of each other, two sets of electrodes 3, each set of electrodes containing three electrodes, displaced 120° relatively to one another and constructed in similar manner as the electrodes indicated in Figs. 3 to 5. At the bottom of the vessel 21, there is a quicksilver layer 4. The remaining portion of the vessel is filled with a liquid mixture of one of the above mentioned quantitative compositions.

When the apparatus is caused to rotate about its vertical axis, the quicksilver will rise along the wall of the receptacle, in proportion as the number of revolutions increases and, gradually, it will short-circuit the two sets of electrodes and, when the normal number of electrodes has been reached, it will have assumed the shape of a cylindrical ring along the outer wall of the vessel.

The start in two steps is attained by the two sets of electrodes short-circuited by the quicksilver, at various numbers of revolutions, being connected with the starting resistance attached to the apparatus, according to the connections shown with dotted lines in Fig. 3, the bottommost set of electrodes in the construction shown in Fig. 6 corresponding to the electrodes inserted in the outermost channel 10 in the construction shown in Fig. 3.

In order to secure an efficient short-circuiting of the electrodes in the construction shown in Fig. 6, there are provided grooves 22 in the inner wall of the vessel 21 at a level with the electrodes, the said grooves being filled with the ascending body of quicksilver.

The outer wall in the cavity of the vessel 21 has not a cylindrical surface but, as it appears from Fig. 6, a slightly conical surface, converging upward. By varying the coning of the said surface, the rise of the quicksilver during the rotation of the motor may be varied so that the short-circuiting of the electrodes is effected by any predetermined number of revolutions.

Having now particularly described and ascertained the nature of our said invention and the manner in which the same is to be performed, we declare that what we claim is:—

1. A switch for automatically short-circuiting electrodes of an electric device or system, comprising a rotary container, quicksilver in said container, and a plurality of sets of electrodes, each electrode having a portion exposed at an inner enclosing wall of said container, the quantity of quicksilver, the container walls by which it is enclosed, the location of the electrodes, and the axis of rotation, being so proportioned and related that none of said electrodes will be short-circuited when said container is at rest, and also such that said electrodes will be short-circuited one set after another, as predetermined velocities are attained by said container during accelerating rotation.

2. A centrifugal starting switch for an asynchronous motor having a rotor winding, said switch comprising a plurality of sets of starting resistance coils adapted to be connected in parallel with sections of said winding, and means for automatically shunting said resistance coils out of circuit set by set, as the speed of rotation of the switch is increased on starting, said switch comprising a container having quicksilver therein, and a plurality of sets of electrodes, one set for each set of resistance coils, the electrodes of each set being so connected to the resistance coils of the corresponding set as to shunt them out of circuit when the electrodes are short-circuited, each of said electrodes also having a portion exposed at the inner enclosing wall of said container, the quantity of quicksilver, the container walls by which it is enclosed, the location of the electrodes, and the axis of rotation, being so proportioned and related that none of said electrodes will be short-circuited when said switch is at rest, and also such that said electrodes will be short-circuited and caused to shunt said resistance coils out of circuit one set after another, as predetermined velocities are attained by said container during the accelerated rotation of said switch on starting said motor.

3. A switch for automatically short-circuiting electrodes of an electric device or system, comprising a rotary container filled in part with quicksilver and in part by a non-conducting fluid, and a plurality of electrodes each having a portion exposed at an inner enclosing wall of said container, the quantity of quicksilver, the container walls by which it is enclosed, the location of the electrodes, and the axis of rotation, being so proportioned and related that none of said electrodes will be short-circuited when said container is at rest, and also such that said electrodes will be short-circuited by said quicksilver when said container attains a predetermined velocity of rotation, the particular velocity at which short-circuiting is effected being determined by the relative specific gravity of the quicksilver and the non-conducting fluid.

In witness whereof, we have hereunto signed our names in the presence of two subscribing witnesses.

JOAKIM ULRIK FREDERIK ANDERSEN.
ADOLF FREDERIK BENNICK IVERSEN.

Witnesses:
  T. B. ALFORD,
  W. E. LICERN.